(12) United States Patent
Chandross et al.

(10) Patent No.: US 6,457,836 B1
(45) Date of Patent: Oct. 1, 2002

(54) MIRROR AND A METHOD OF MAKING THE SAME

(75) Inventors: Edwin Arthur Chandross, Murray Hill, NJ (US); John David Weld, Ledgewood, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/071,381

(22) Filed: Feb. 8, 2002

Related U.S. Application Data

(62) Division of application No. 09/897,671, filed on Jul. 2, 2001, now Pat. No. 6,382,807.

(51) Int. Cl.[7] .................................................. G02B 5/08
(52) U.S. Cl. ........................ 359/883; 359/884; 359/838
(58) Field of Search .................................. 359/883, 884, 359/838, 850, 852, 867, 900, 846, 847; 428/312.6, 314.8, 317.1

(56) References Cited

U.S. PATENT DOCUMENTS

| | | | | |
|---|---|---|---|---|
| 5,928,803 A | * | 7/1999 | Yasuda | 374/101 |
| 6,195,194 B1 | * | 2/2001 | Roberts et al. | 359/265 |
| 6,350,328 B1 | * | 2/2002 | Hostetler | 148/559 |
| 6,404,548 B1 | * | 6/2002 | Tatsuki et al. | 359/443 |

\* cited by examiner

*Primary Examiner*—Mohammad Sikder
(74) *Attorney, Agent, or Firm*—Ozer M. N. Teitelbaum

(57) ABSTRACT

A reflective element, such as a mirror, includes a substrate and a reflective layer formed thereon. The substrate comprises at least one thixotropic metal alloy, which is injected into a mold to form the shape desired for the reflective element. The reflective element may also include an interface layer comprising a thermoset material, such as an epoxy resin, formed between the substrate and the reflective layer to increase the smoothness of the substrate.

27 Claims, 3 Drawing Sheets

MIRROR AND A METHOD OF MAKING THE SAME

This application is a Division of Ser. No. 09/897,671 Jul. 2, 2001 now U.S. Pat. No. 6,382,807.

FIELD OF THE INVENTION

The present invention relates to mirrors for use in various applications, including, for example, free space optical communication systems.

BACKGROUND OF THE INVENTION

Wireless communication systems involve the transmission and reception of wireless signals. To date, wireless communication systems have been mostly designed to operate in the radio frequency ("RF") spectrum. The information-carrying capacity of a wireless communication system is determined by the frequency (or wavelength) of the wireless signal. More particularly, higher frequency (or shorter wavelength) wireless signals provide greater information-carrying capacity than lower frequency signals. With the demand for greater information-carrying capacity increasing, it has become apparent that the RF spectrum may shortly become less attractive for some (e.g., urban or metro) wireless communication applications.

Various alternatives for increasing the information-carrying capacity of wireless communication systems have been explored. One such alternative currently being considered is using the optical spectrum for signals in place of the RF spectrum. Given their relatively shorter wavelengths, optical signals support higher data transmission speeds—upwards of 10 gigabits per second—than RF wireless signals. With these data transmission speeds, free space optical communication systems offer greater information-carrying capacity than wireless systems designed to operate in the RF spectrum.

Typically, free space optical communication systems include at least one transmitting unit and at least one receiving unit. The transmitting and receiving units are each mounted on a platform located, for example, on top of a building structure, to provide an unobstructed path for the transmission and reception of free space optical signals. Each unit in a free space optical communication system includes at least one mirror for optically linking (e.g., coupling) the transmitting and receiving units together. More particularly, the mirror within the transmitting unit conveys a free space optical signal from a light source to the mirror in the receiving unit. In turn, the mirror in the receiving unit conveys the received free space optical signal to a photo-detector.

Free space optical signals propagate in a more directional manner (e.g., point to point) than RF wireless signals. Consequently, precise alignment between the mirrors of the transmitting and receiving units is required to insure the complete reception of a free space optical signal. Achieving such precise alignment, however, is dependent on environmental conditions, since each unit is mounted on the top of a building structure, for example. When exposed to a wide range of temperatures (e.g., from −40° F. to 120° F.), the precise shape (e.g., the curvature) of a typical, inexpensively manufactured mirror is compromised. Thus, if such a mirror were to be used in a free space optical communication system, the precision of the alignment may be compromised because the coefficient of thermal expansion ("CTE") of the materials employed in manufacturing the mirrors and mountings, for example, may not sufficiently match.

In view of these shortcomings, mirrors used in free space optical communication system have, to date, been made by known process techniques associated with the manufacture of high grade, optical quality components. One such process technique has included machining the surface of a bulk metal substrate. Mirrors manufactured using these process techniques maintain their precise shape (e.g., structural integrity), and thusly, their alignment, in the face of exposure to a wide range of temperatures (e.g., from −40° F. to 120° F.). Machining the surface of a bulk metal substrate, however, is a time consuming procedure, adding considerable expense in the manufacture of the mirror.

SUMMARY OF THE INVENTION

We have invented a relatively less time consuming and inexpensive method of making a high grade, optical quality reflective element, such as a mirror. More particularly, we have invented a reflective element able to maintain its precise shape if exposed to a wide range of temperatures (e.g., from −40° F. to 120° F.). In one aspect of the present invention, our reflective element comprises a reflective layer formed on a thixotropic metal alloy substrate. For the purposes of the present invention, thixotropic metal alloy, at a particular temperature below melting and above solid state, has a slurry (e.g., semi-solid or plastic like) form. Illustratively, the thixotropic metal alloy substrate is advantageously formed using a casting, molding or injection-molding step, and may also include, for example, shaping, cooling or solidifying the thixotropic metal alloy within a mold, for example.

In another aspect of the present invention, our reflective element comprises a reflective layer formed on an injection-molded substrate. Here, the injection-molded substrate advantageously comprises a thixotropic metal alloy, which is shaped, cooled and/or solidified, for example, within the injection-mold. One process technique for forming the thixotropic-based metal substrate is Thixomolding®, wherein a thixotropic metal alloy, comprising magnesium to date, is injection-molded while in a slurry form.

We have recognized that a mirror having a thixotropic metal substrate is capable of maintaining its precise shape over a considerably wider range of temperatures than a typical, inexpensively manufactured mirror. In one example of the present invention, our mirror is formed by shaping, cooling or solidifying a thixotropic metal alloy slurry injected into a mold, and subsequently forming a reflective layer thereon. Advantageously, this approach is less time consuming and considerably less expensive than the machining techniques associated with the manufacture of precision optical quality components.

We have also recognized that the smoothness of the surface of a cast, molded or injection-molded thixotropic metal alloy mirror may be insufficient for certain applications. More particularly, we have recognized that injection-molding a thixotropic metal alloy to form the substrate may create microscopic irregularities greater than 1 μm in size. Microscopic irregularities include, for example, crevices, divots, holes or bumps along the surface of substrate.

In the present invention, the smoothness of the surface of the cast, molded or injection-molded thixotropic metal alloy substrate may be improved by incorporating a polymeric interface layer between the substrate and the reflective layer. The polymeric interface layer acts as a quasi-conformal coating. For the purposes of the present invention, quasi-conformal means conforming to the curvature of the substrate, if the substrate is curved, while providing a smooth surface for the reflective layer that does not conform crevices, divots, holes or bumps along the surface of substrate greater than a particular size. The size of the microscopic irregularities allowable along the surface of substrate is a function of the wavelength of the electromagnetic energy to be reflected by the reflective element. More particularly, the surface of the substrate of our mirror should be free of microscopic irregularities within "+" or "−" one-quarter (¼) of the signals' wavelength (λ). Given the wavelengths of optical signals in the broadband communications spectrum range between 1.3 μm and 1.6 μm, the surface of the substrate of our mirror should be minimally free of microscopic irregularities of greater than 0.5 μm. However, it will be apparent that for wavelengths in the upper bands of broadband communications spectrum range, the surface of the substrate of our mirror should be free of microscopic irregularities of greater than 0.3 μm or, perhaps even less. The polymeric interface layer comprises a thermoset material, such as an epoxy resin, for example. By incorporating the polymeric interface layer, the surface of the substrate is free of microscopic irregularities greater than +/−(¼) of the optical signals' wavelength (λ).

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely representations and thus are not intended to portray the specific parameters or the structural details of the invention, which may be determined by one of skill in the art by examination of the information contained herein.

DETAILED DESCRIPTION

Historically, one method for making high grade, optical quality components has been to machine a bulk metal substrate. Thereafter, the surface of the bulk metal substrate may be polished. The precise shape of a mirror manufactured by this technique may be maintained, particularly in the face of exposure to a wide range of temperatures (e.g., from −40° F. to 120° F.). Consequently, machining the surface of a bulk metal substrate has been an attractive technique for making a mirror used in free space optical communication systems, for example.

High precision machining of the surface of a bulk metal substrate, however, is a time consuming procedure, adding considerable expense to the manufacture of a high grade, optical quality mirror. As such, a number of alternative process techniques have been explored for making such a mirror. While reducing the cost of manufacture, these process alternatives fail to produce a high grade, optical quality mirror capable of maintaining its precise shape when exposed to a wide range of temperatures (e.g., from −40° F. to 120° F.).

Figure 1A:
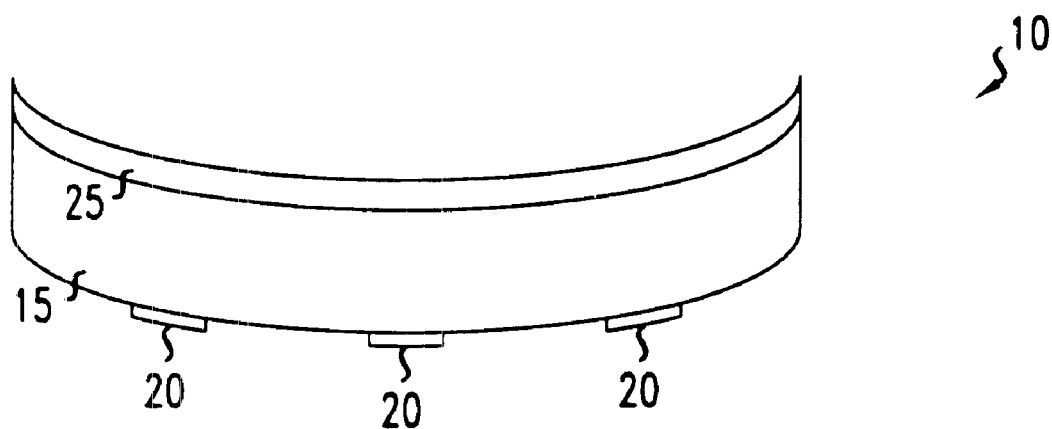
FIGS. 1(a) and 1(b) are cross-sectional and perspective views of an embodiment of the present invention.
Figure 1B:
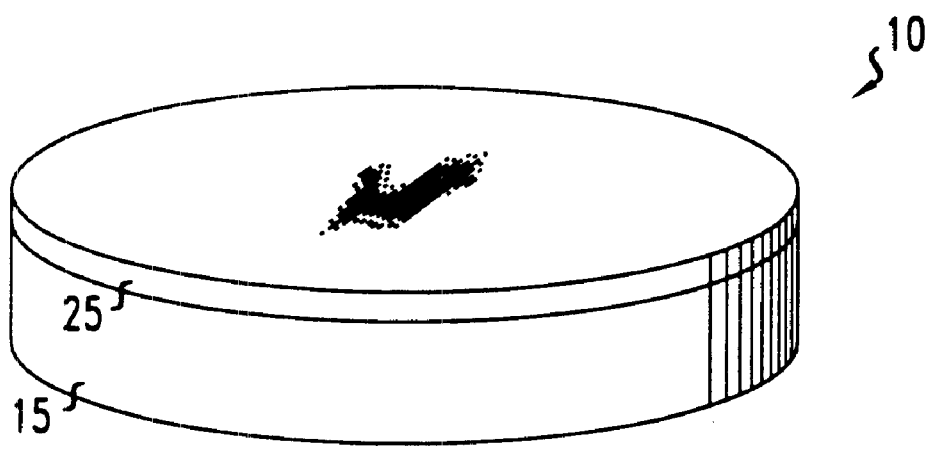

Referring to FIGS. 1(a) and 1(b), cross-sectional and perspective views of an embodiment of the present invention are illustrated. Here, a reflective element 10 is shown. Reflective element 10 reflects electromagnetic energy, such as free space optical signals, for example. In one example of the present invention, reflective element 10 is a mirror.

By design, reflective element 10 is able to maintain its precise shape if exposed to a wide range of temperatures (e.g., from −40° F. to 120° F.). To that end, reflective element 10 includes a substrate 15. Substrate 15 comprises at least one thixotropic metal alloy. The thixotropic metal alloy advantageously comprises a magnesium (Mg) alloy(s). However, aluminum (Al) alloy(s) or zinc (Zn) alloy(s), for example, are also contemplated as possible thixotropic metal alloys. While as moldable as plastics and other resins, objects formed from thixotropic metal alloys offer greater thermostability, and as such, maintain their precise shape over a wider range of temperatures. To further increase the precise shape of substrate 15, support means 20 may be formed on the bottom side of substrate 15. Support means 20 may be realized by various different elements, including, for example, a plurality of ribs.

Advantageously, substrate 15 may be formed by performing an injection-molding step. Here, a thixotropic metal alloy, in a slurry form, is injected into a mold. The mold comprises a desired shape, including a paraboloid, for example. Thereafter, the injected thixotropic metal alloy is shaped, cooled and/or solidified within a mold to form substrate 15.

It should be noted that magnesium alloy might deteriorate over time after forming substrate 15. To insure the surface quality of substrate 15 formed from a thixotropic magnesium alloy, a surface protective layer (not shown), or interfacial layer, may be applied onto substrate 15. This interfacial layer may comprise nickel, by a plating process, for example.

Reflective element 10 also comprises a reflective layer 25 for reflecting electromagnetic energy, such as optical signals in the infrared ("IR") spectrum, for example. As shown, reflective layer 25 is formed on substrate 15. Reflective layer 25 may formed by various methods, including evaporating a reflective metal ever substrate 15. The reflective metal selected is dependent on a number of factors, including the wavelength of the electromagnetic energy to be reflected by reflective element 10. In one example of the present invention, the reflective metal comprises at least one of gold (Au), silver (Ag) and aluminum (Al), which provide relatively high reflectivity of optical signals in the broadband communications optical spectrum, such as the infrared ("IR") spectrum. Reflective element 10 may also comprise a protective overcoat to prevent damage through corrosion or scratching to reflective layer 25, much like the technology employed in mirrors for use with telescopes. The protective overcoat may be a clear coat comprising a material harder than the reflective metal, such as a polymer or nitride, for example. The clear coat may be formed by evaporation.

Since substrate 15 is injection-molded, the smoothness of the surface of reflective element 10 may be insufficient for certain applications. While injection-molding is a relatively inexpensive process, the exactitude in replicating the intended mold is limited by a number of variables. More particularly, it is not uncommon to expect the surface of substrate 15 on which reflective layer 25 is formed to have microscopic irregularities. Microscopic irregularities include, for example, crevices, divots, holes or bumps along the surface of substrate 15. Microscopic irregularities along the surface of substrate 15 distort the reflection of an optical signal by reflective element 10. For optical signals in the IR spectrum, microscopic irregularities of this magnitude may compromise the performance of reflective element 10. Consequently, a need also exists for an inexpensive, high grade, optical quality reflective element having a reflective surface free of microscopic irregularities greater than +/−(¼) of the reflected optical signals' wavelength (λ) to minimize distorting the reflection of an incoming IR optical signal. Much like reflective element 10, such an inexpensive, high grade, optical quality reflective element will ideally maintain its precise shape if exposed to a wide range of temperatures (e.g., from −40° F. to 120° F.). Advantageously, the coefficient of thermal expansion of the materials of the mirror and its mounting (not shown) are closely matched to avoid changes in shape caused by different rates of expansion.

Figure 2A:
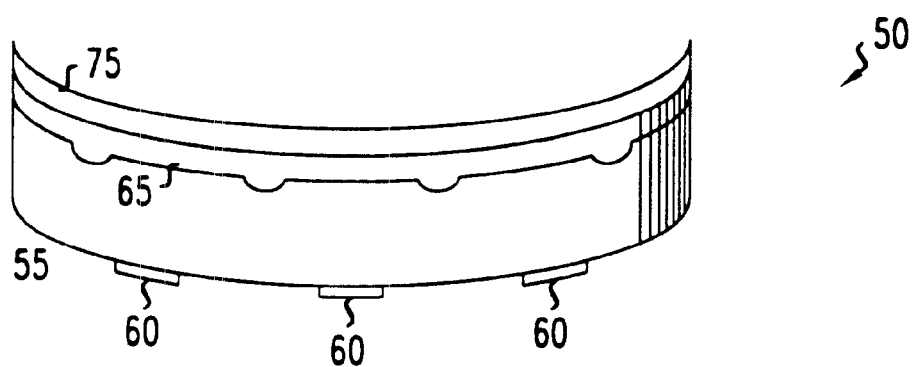
FIGS. 2(a) and 2(b) are cross-sectional and perspective views of an example of the present invention.
Figure 2B:
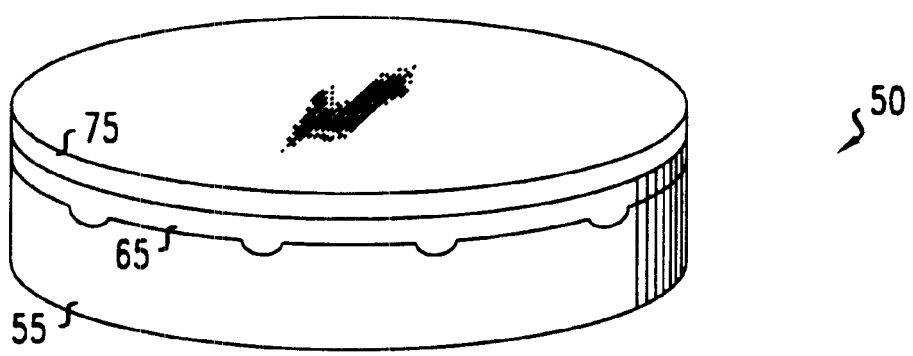

Referring to FIGS. 2(a) and 2(b), cross-sectional and perspective views of an example of the present invention are illustrated. Here, an inexpensive, high grade, optical quality mirror 50 is shown. Mirror 50 has a reflective surface that is free of microscopic irregularities greater than +/−(¼) of the reflected optical signals' wavelength (λ). By limiting each microscopic irregularity to less than +/−(¼) of the reflected optical signals' wavelength (λ), the distortion associated with the reflection of an incoming free space optical signal in the IR spectrum is negligible.

Mirror 50, much like reflective element 10 of FIGS. 2(a) and 2(b), maintains its precise shape in the face of exposure to a wide range of temperatures (e.g., from −40° F. to 120° F.). Mirror 50 includes a substrate 55 formed from at least one thixotropic metal alloy, such as aluminum (Al), magnesium (Mg) or zinc (Zn), for example. Substrate 55 is formed by injecting a thixotropic metal alloy, in a slurry form, into a mold. The mold comprises a desired shape, including a paraboloid, for example. Thereafter, the injected thixotropic metal alloy is shaped, cooled and/or solidified within a mold to form substrate 55.

To create a reflective surface on substrate 55 free of microscopic irregularities greater than +/−(¼) of the reflected optical signals' wavelength (λ), mirror 50 comprises a polymeric interface layer 65. Polymeric interface layer 65 provides a coating over the surface of substrate 55. More particularly, polymeric interface layer 65 is a quasi-conformal coating, as defined hereinabove, on the surface of substrate 55.

Various materials may be used for polymeric interface layer 65. In one example of the invention, polymeric interface layer 65 comprises a thermoset material, such as an epoxy resin. Advantageously, the thermoset material has sufficient binding properties to cause it to adhere to substrate 55.

Polymeric interface layer 65 is also sufficiently thin to avoid issues regarding matching coefficients of thermal expansion. Polymeric interface layer 65 may be formed using a number of techniques. In one approach, polymeric interface layer 65 is formed by a compression molding process. Here, polymeric interface layer 65 may have a thinness of about 10 μm, for a substrate 55 of between 3 and 12 inches in diameter. In another approach, polymeric interface layer 65 is formed by a transfer resin molding process. For a substrate 55 of between 3 and 12 inches in diameter, polymeric interface layer 65, here, may have a thinness of about between 50 μm and 100 μm. Casting from a fluid prepolymer resin is known to permit high precision replication.

As noted hereinabove, cast, molded or injection-molded thixotropic metal alloys offer greater thermostability than plastics and other resins, and as such, maintain their precise shape over a wider range of temperatures. To further increase the precise shape of substrate 55, support means 60 may be formed on the bottom side of substrate 55. Support means 60 may be realized by various different elements, such as, for example, a plurality of ribs.

Mirror 50 also comprises a reflective layer 75 for reflecting electromagnetic energy, such as optical signals in the infrared ("IR") spectrum, for example. Reflective layer 75 may formed by various methods, including evaporating a reflective metal over substrate 55. The reflective metal selected is dependent on a number of factors, including the wavelength of the electromagnetic energy to be reflected by reflective element 55. In one example, the reflective metal comprises gold (Au), silver (Ag) or aluminum (Al), which provide relatively high reflectivity of optical signals in the infrared ("IR") spectrum. Much like reflective element 10, mirror 50 may also comprise a protective overcoat to prevent damage through corrosion or scratching reflective layer 75.

Figure 3A:
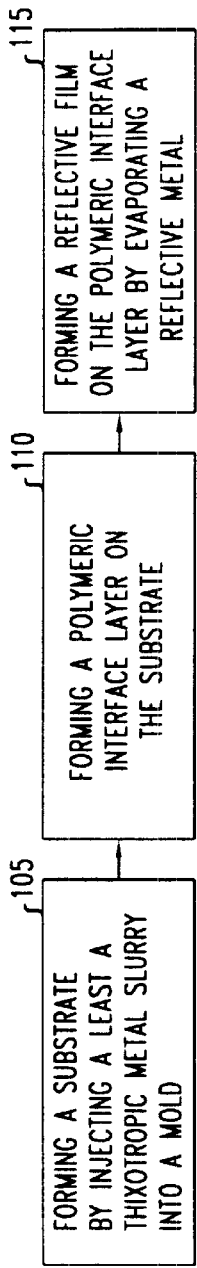
FIGS. 3(a) and 3(b) are flow charts to a method of making a reflective element of the present invention.

Referring to FIG. 3(a), a first flow chart to a method of making a reflective element is shown. The method initially comprises the step (105) of forming a substrate by injecting at least one thixotropic metal alloy, in a slurry form, into a mold. The thixotropic metal alloy comprises at least one of aluminum (Al), magnesium (Mg) or zinc (Zn), for example. The formation of the substrate is complete after the injected thixotropic metal alloy slurry is shaped, cooled and/or solidified within the mold.

With the substrate formed, the reflective element may be completed by performing the step (115) of forming a reflective layer. However, the smoothness of the surface of the substrate onto which the reflective layer is formed may be of concern because of microscopic irregularities greater than +/−(¼) of the reflected optical signals' wavelength (λ). Here, the step of (110) forming a polymeric interface layer on the substrate is executed prior to forming the reflective layer. As stated hereinabove, the polymeric interface layer provides a quasi-conformal coating, as defined hereinabove, over the surface of substrate to increase the smoothness of the substrate's surface. The polymeric interface layer comprises a thermoset material, such as an epoxy resin, for adhering to the substrate's surface.

Once the polymeric interface layer is formed, the step (115) of forming a reflective layer may be executed. This step includes evaporating a reflective metal to form the reflective layer on the polymeric interface layer. In one example, the reflective metal comprises gold (Au), silver (Ag) or aluminum (Al), which provide relatively high reflectivity of optical signals in the infrared ("IR") spectrum. As noted hereinabove, a protective overcoat may be formed thereafter over the reflective layer to prevent damage through corrosion or scratching. The protective overcoat may be a clear coat comprising a material harder than the reflective metal, such as a polymer or nitride, for example. The clear coat may be formed by evaporation.

Figure 3B:
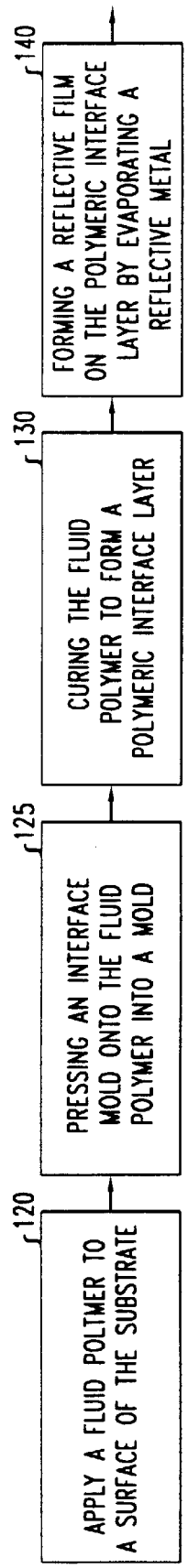

Referring to FIG. 3(b), a second flow chart to a method of making a reflective element is shown. More particularly, one example of a method for performing the step (110) of forming a polymeric interface layer on the substrate of FIG. 3(a) is illustrated. Initially, the step (120) of applying a pre-polymer to a surface of the substrate is performed. As detailed hereinabove, this pre-polymer comprises a fluid precursor to a thermoset material, such as an epoxy resin. Once the pre-polymer is applied to the surface of the substrate, the step (125) of pressing an interface mold onto the pre-polymer is performed. By executing this pressing step (125), the thickness of the pre-polymer is more uniformly distributed along the surface of the substrate and will provide a surface free of microscopic irregularities within "+" or "−" one-quarter (¼) of the signals' wavelength (λ). The thickness of the pre-polymer may be less than 10 μm, to avoid mismatch issues associated with the coefficient of thermal expansion.

In one example, the mirror formed by this method has a paraboloid shape. As such, the pre-polymer is applied to the surface of the substrate, which is curved. The interface mold, consequently, is also curved, having a radius of curvature about the same as the radius of curvature of the surface of the substrate.

Upon completing the pressing step (125), the step (130) of curing the pre-polymer, as applied and pressed onto the surface of the substrate is performed. The pre-polymer is cured at about 150–200° C. By curing the pre-polymer, a stable thermoset polymer interface layer is formed on the substrate. The polymer interface layer is quasi-conformal, as defined hereinabove, such that the surface of the substrate is useful for free space optical communications, for example. Consequently, the reflective surface is free of microscopic irregularities greater than +/−(¼) of the reflected optical signals' wavelength (λ).

Once the polymeric interface layer is formed on the surface of the substrate, the step (140) of forming a reflective layer is performed. As stated hereinabove, the reflective layer is formed by evaporating a reflective metal onto the polymeric interface layer. In one example, the reflective metal comprises gold (Au), silver (Ag) or aluminum (Al), which provide relatively high reflectivity of optical signals in the infrared ("IR") spectrum.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. It is therefore contemplated that the appended claims will cover any such modifications or embodiments as fall within the true scope of the invention.

What is claimed is:

1. A method comprising:
    forming a reflective layer on a substrate comprising a shaped thixotropic metal alloy.

2. The method of claim 1, wherein the step of forming a reflective layer on a substrate comprising a shaped thixotropic metal alloy comprises:
    forming the substrate by injecting a slurry from the at least one thixotropic metal alloy into a mold.

3. The method of claim 2, wherein the step of forming the substrate comprises:
    forming a polymeric interface layer on the substrate such that the reflective layer is formed on the polymeric interface layer.

4. The method of claim 3, wherein the polymeric interface layer is formed on a surface of the substrate, the surface free of a microscopic irregularity greater than +/−(¼) of the wavelength of electromagnetic energy reflected by the reflective layer.

5. The method of claim 3, wherein the step of forming a polymeric interface layer comprises:
    applying a pre-polymer onto the substrate, the pre-polymer comprising a thermoset material;
    pressing an interface mold onto the pre-polymer; and
    curing the pre-polymer to form the polymeric interface layer.

6. The method of claim 5, wherein the pre-polymer is applied to a curved surface of the substrate, the curved surface having a radius about the same as a radius of the interface mold.

7. The method of claim 5, wherein the step of forming a reflective layer comprises depositing a metal layer on the polymeric interface layer by evaporating a reflective metal.

8. The method of claim 7, wherein the at least one thixotropic metal alloy comprises at least one of zinc, aluminum and magnesium, the thermoset material comprises an epoxy resin, and the reflective metal comprises at least one of gold, silver and aluminum.

9. A method of making a mirror, the method comprising:
    forming a substrate by injecting at least one thixotropic metal alloy slurry into a mold, the at least one thixotropic metal alloy comprising at least one of zinc, aluminum and magnesium;
    forming a polymeric interface layer, the step of forming a polymeric interface layer comprising:
        applying a pre-polymer to a curved surface of the substrate, the pre-polymer comprising a thermoset material;
        pressing an interface mold onto the pre-polymer, the interface mold having a radius about the same as a radius of the curved surface; and
        curing the pre-polymer to form the polymeric interface layer; and
    forming a reflective layer by evaporating a reflective metal, the reflective metal comprising at least one of gold, silver and aluminum, the reflective layer formed on a surface of the polymeric interface layer, the surface of the polymeric interface layer free of a microscopic irregularity greater than +/−(¼) of the wavelength of electromagnetic energy reflected by the reflective layer.

10. A method comprising:
    forming a reflective layer on a thixotropic metal alloy substrate.

11. The method of claim 10, wherein the step of forming a reflective layer on a thixotropic metal alloy substrate comprises:
    forming the substrate by injecting a slurry from the at least one thixotropic metal alloy into a mold.

12. The method of claim 11, wherein the step of forming the substrate comprises:
    forming a polymeric interface layer on the substrate, the reflective layer formed on the polymeric interface layer.

13. The method of claim 12, wherein the polymeric interface layer is formed on a surface of the substrate.

14. The method of claim 13, wherein the surface is free of a microscopic irregularity greater than about +/−(¼) of a wavelength of electromagnetic energy reflected by the reflective layer.

15. The method of claim 11, wherein the step of forming a polymeric interface layer comprises:
    applying a pre-polymer onto the substrate, the pre-polymer comprises a thermoset material;
    pressing an interface mold onto the pre-polymer; and
    curing the pre-polymer to form the polymeric interface layer.

16. The method of claim 15, wherein the pre-polymer is applied to a curved surface of the substrate.

17. The method of claim 16, wherein the curved surface has a radius about the same as a radius of the interface mold.

18. The method of claim 15, wherein the step of forming a reflective layer comprises depositing a metal layer on the polymeric interface layer by evaporating a reflective metal.

19. The method of claim 18, wherein the at least one thixotropic metal alloy comprises at least one of zinc, aluminum and magnesium.

20. The method of claim 18, wherein the thermoset material comprises an epoxy resin.

21. The method of claim 18, wherein the reflective metal comprises at least one of gold, silver and aluminum.

22. A method of making a mirror, the method comprising:

forming a substrate by injecting at least one thixotropic metal alloy slurry into a mold;

forming a polymeric interface layer; and forming a reflective layer by evaporating a reflective metal.

23. The method of claim 22, wherein the at least one thixotropic metal alloy comprising at least one of zinc, aluminum and magnesium.

24. The method of claim 22, wherein the step of forming a polymeric interface layer comprises:

applying a pre-polymer to a curved surface of the substrate, the pre-polymer comprising a thermoset material;

pressing an interface mold onto the pre-polymer, the interface mold having a radius about the same as a radius of the curved surface; and curing the pre-polymer to form the polymeric interface layer.

25. The method of claim 22, wherein the reflective metal comprises at least one of gold, silver and aluminum.

26. The method of claim 22, wherein the reflective layer is formed on a surface of the polymeric interface layer.

27. The method of claim 26, wherein the surface of the polymeric interface layer is free of a microscopic irregularity greater than about $+/-(\frac{1}{4})$ of a wavelength of electromagnetic energy reflected by the reflective layer.

* * * * *